US007282695B2

(12) United States Patent
Weber et al.

(10) Patent No.: US 7,282,695 B2
(45) Date of Patent: Oct. 16, 2007

(54) ACTIVE SEARCH SENSOR AND A METHOD OF DETECTION USING NON-SPECULAR REFLECTIONS

(75) Inventors: Jonathan L. Weber, Nashua, NH (US); Timothy J. O'Donnell, Bedford, NH (US); Norman O. Marler, Mont Vernon, NH (US); Kathryn G. Lanier, Mont Vernon, NH (US)

(73) Assignee: BAE Systems Information and Electric Systems Integration Inc., Nashua, NH (US)

( * ) Notice: Subject to any disclaimer, the term of this patent is extended or adjusted under 35 U.S.C. 154(b) by 113 days.

(21) Appl. No.: 11/064,589

(22) Filed: Feb. 24, 2005

(65) Prior Publication Data

US 2007/0034776 A1    Feb. 15, 2007

Related U.S. Application Data

(60) Provisional application No. 60/547,990, filed on Feb. 26, 2004.

(51) Int. Cl.
  G02F 1/01     (2006.01)
  G01C 21/02    (2006.01)
  G01C 3/00     (2006.01)
  G01C 3/08     (2006.01)

(52) U.S. Cl. .................. 250/225; 250/203.1; 356/4.01; 356/5.02

(58) Field of Classification Search ................ 250/206, 250/206.1, 203.1, 203.2, 203.6, 225; 356/4.01, 356/5.01–5.08, 28, 28.5, 138, 141.1, 139.07, 356/614, 622, 141
See application file for complete search history.

(56) References Cited

U.S. PATENT DOCUMENTS

| 4,062,267 A |   | 12/1977 | Vinches et al. |
| 4,556,313 A |   | 12/1985 | Miller, Jr. et al. |
| 6,069,565 A | * | 5/2000  | Stern et al. ................. 340/583 |
| 6,343,766 B1 | * | 2/2002 | Livingston ................. 244/3.13 |
| 6,603,134 B1 |  | 8/2003  | Wild et al. |

OTHER PUBLICATIONS

PCT International Search Report dated Sep. 6, 2006 of International Application No. PCT/US05/005991 filed Feb. 24, 2005.

* cited by examiner

*Primary Examiner*—Georgia Epps
*Assistant Examiner*—Don Williams
(74) *Attorney, Agent, or Firm*—Robert K. Tendler; Daniel J. Long

(57) ABSTRACT

It has been found that target optics produce non-specular, augmented optical returns when interrogated by a laser pulse. This non-specular radiation is detected by an active laser search system employing a direct-reading, thresholded focal plane detector that is able to detect non-cooperating targets with optics that employ a detector or optical element at the focal plane of their receiving optics. The pulses returned from such target optics have a width commensurate with the original transmitted pulse width, whereas passive background noise and the spread out active returns from the ground exhibit temporally long returns. By setting the sensor threshold sufficiently high, the system discriminates against noise and clutter while at the same time reducing the number of sweeps required to detect a target within the search area.

19 Claims, 9 Drawing Sheets

ACTIVE SEARCH SENSOR AND A METHOD OF DETECTION USING NON-SPECULAR REFLECTIONS

RELATED APPLICATIONS

This Application claims rights under 35 U.S.C. 119(e) from U.S. application Ser. No. 60/547,990 filed Feb. 26, 2004, the contents of which are incorporated herein by reference.

FIELD OF THE INVENTION

This invention relates to active laser search systems and more particularly to the use of an improved active sensor receiver detector array that can detect non-specular reflections from illuminated optical systems.

BACKGROUND OF THE INVENTION

As described in U.S. Pat. No. 6,603,134 issued to Norman R. Wild and Paul M. Leavey, Jr. on Aug. 5, 2003, assigned to the assignee hereof and incorporated herein by reference, a system for detecting target threats is described in which a high-energy laser is scanned across an area on the ground and retroreflections from the human eye or the focal plane associated with an optical system are detected, thus to give an indication of the presence of the target within the scanned field.

As described in the Wild patent, Wild et al. were the first to discover that any kind of focusing device in combination with a surface exhibiting any degree of reflectivity and positioned near the focal plane of the device acts as a retroreflector. This applies not only to the human eye, but to any optical system used by a threat or target. A typical, though not exclusive list of examples includes night vision goggles, telescopic sights of any kind, ordinance-aiming devices using optics, tracking sensors or missile guidance systems employing focal plane arrays. It is noted that such systems involve augmented optical returns due to the fact that reflected light emanating from the focal plane is focused out of the optics as a collimated beam. The same optical behavior that transforms incoming light into an image at the focal plane guarantees that reflections at this surface are collimated into a beam and sent directly back to the source of the incident light.

In such active search systems, a laser pulse is scanned across a given area, usually from an aircraft onto the ground, and retroreflection of the type described in the Wild et al. patent is detected, thus to detect the presence of an enemy or non-cooperative threat or target. As will be appreciated, the collimated retroreflected beam will come back to the interrogating laser only a small percentage of the time due to the fact that it is focused in only one direction, necessitating a large number of sweeps or scans in order to make sure that if there is a threat in the search area it will be detected. This requires extended dwell times in order to execute the large number of sweeps required to ensure that if there is a threat in the search area, it will be detected. Thus, looking for retroreflections is at best problematical.

What makes such a system more problematical is the fact that most optical designers tilt the focal plane associated with the optical system with respect to the optical axis or boresight of the system. This can be done for a number of reasons. However, since the development of the Wild et al. optical detection system, there are those who have sought to thwart the system by tilting the focal plane such that incoming radiation from a search laser is directed off the optical axis and is not retroreflected out along the optical axis. Thus even a large number of laser sweeps can fail to detect a target of interest if such angled focal planes are employed.

It is noted that the focal plane need not be angled by a great amount in order for there to be no retroreflection or specular reflection out of the optical system. The term specular reflection is used herein to refer that the reflection is in accordance with the Law of Reflection; i.e. a specular reflection in which the angle of incidence equals the angle of reflection.

Thus there has been a question as to whether one could even detect a target in which no specular reflection reached the interrogating laser.

As mentioned above, the Wild et al. system, which relies upon retroreflection, also suffers from the problem that the optical axis of the target optic usually is not pointed in the direction of the interrogating laser. Even when the target uses scanning optics, the retroreflected or specularly reflected energy is not returned to the interrogating laser more than momentarily, for instance, less than 1% of the time. Thus, when using an active search system to scan a given area on the ground, the probability of detecting such a specular reflection is exceedingly low due to the small amount of time that the target optics are pointed at the interrogating laser.

More particularly, there are several factors that may have prevented the widespread use of the techniques discovered by Wild et al. in active search applications. In such active search systems, a laser pulse is scanned across a given area, usually from an aircraft onto the ground, and retro-reflection of the type described in the Wild et al. patent is detected, thereby revealing the presence of a potential enemy threat or non-cooperative target.

It is noted that Wild et al. focused on a particular subset of optical systems, and by doing so, made implicit assumptions about the nature of the retro-reflections being produced by their technique. Specifically, they describe providing persistent, high-amplitude returns. Persistence refers to the fact that the return is always produced when the optic is illuminated. High-amplitude refers to a reliance on direct specular reflection. The term specular as used herein denotes the portion of reflected energy that behaves according to the elementary law of reflection equating the incident and reflected angles.

By intentional design and or technological advances, the landscape has now broadened to include devices and conditions not considered by Wild et al. What follows are several of the practical limitations of such advances, as well as the manner in which the subject method overcomes them.

First among these are developments in optical design that suppress the retro-reflections from optical systems. Whether done intentionally to counter the effects discovered by Wild et al., or simply to solve unrelated engineering challenges, techniques such as focal plane tilting can dramatically reduce optically augmented returns. The result of these developments is a lower detection probability. This is turn translates into longer search times and/or higher laser power requirements for active search systems.

The second effect is the low probability of observing specular returns from scanner devices like line arrays, reticles and rosettes. As mentioned above, a Wild et al. system relies upon on persistent specular returns. Since scanning systems have a low temporal duty cycle, their returns are intermittent, providing large returns only momentarily during each scan pattern. Thus when using an active search system to scan a given patch of ground, the detection probability is low indeed due to the small amount of time that the target optics and interrogating laser are mutually co-aligned. Those familiar with analogous radar systems will recognize this effect as the scan-on-scan problem.

The third series of effects are environmental factors encountered in operational environments. Clear air turbulence, for example, further exacerbates the intermittent return problem. In fact, it can even make the specular returns from staring sensors fade in and out over time. This requires extended dwell times or an increased number of sweeps over the same area in order to ensure the detection of existing targets.

Finally, ground clutter is a problem and is a consequence of the preceding effects. The lowered, intermittent and generally degraded optical returns are forced to compete with the comparable returns from ground bounces. It is from such a cluttered background that optical signals must emerge if they are to be detected.

Other factors which have a bearing on the need for an improved active search system and a method for its use include the following: 1. The large power requirement for active search lasers used over long ranges and wide search areas; 2. The high noise levels of conventional detector arrays; 3. The poor match between detector array temporal characteristics and requirements for active search receivers; and 5. The difference between ground and tracking sensor returns.

These circumstances have led to the failure of previous active search systems intended to find passive tracking sensors. Furthermore, they have limited systems in development to using passive means such as missile launch detection to perform the initial acquisition. There is therefore a need for an improved active sensor and a method for its use that provides a solution to the problems of the prior art.

SUMMARY OF INVENTION

The present invention comprises two elements. The first is an alternative detection method that mitigates the problems encountered by the prior art. The second element is a method of constructing a search receiver that accommodates the first element.

With regard to an alternate detection technique, it has been found that when an optical system having some sort of device at its focal plane is interrogated by a laser pulse, there is a certain amount of scatter in all directions, not just along the specular axis. These non-specular reflections, while several orders of magnitude lower than the specular returns, are nonetheless collimated by the optics and constitute optically augmented returns.

It is a further finding of this invention that this scatter, when focused out of the system, can be detected. However, because of the low intensity of non-specular returns one must be able to discriminate against scattering or clutter from the ground. It will be appreciated that sand, dirt, pavement, foliage and other earth-bound objects will to some extent also scatter the incoming laser radiation. It is against such clutter that any threat sensor competes for detection.

The advantage of looking for non-specular returns lies in their reliability. This is because they are always present, regardless of scanner duty cycle or atmospherics, or any of the factors detailed above. When one relies on specular optically augmented returns, by contrast, an inordinate number of sweeps are required in order to guarantee a detection. The trade of return amplitude versus sweep time tips heavily in the favor of a non-specular strategy.

One might be tempted to detect the non-specular returns using standard detector electronics, assuming integrating focal plane detectors could be made sensitive enough. However, the integration times required for sufficient signal would also admit photons that are the result of back-scatter from the surface of the earth, thus completely obscuring the non-specular returns from the target optics. Thus, efforts to increase sensitivity of a standard array to the point of being able to detect non-specular returns fail because the non-specular returns are swamped by clutter returns.

As discussed in PCT Patent Application U.S. 2003/037042 filed Nov. 17, 2003, incorporated herein by reference, an improved active sensor array has been found to be useful in distinguishing clutter and background radiation from returns from target optics. On each pixel in the array, the integrating amplifier is replaced by a threshold sensor. The threshold is set to a sufficiently high signal to noise ratio that random accidental events are rare.

A key enabler to this method is direct access to row and column registers that signal detection of an event on any pixel, thereby eliminating the overhead functions associated with having to read all the pixels in a two dimensional array. Instead of reading all the pixels, the entire frame content is determined by which registers have signaled an event. All other pixels have a logical zero. Each detector thus has a one bit analog-to-digital converter.

Considering an active search system that projects a laser with pulse widths on the order of one nanosecond, it will be appreciated that scatter from the closest point on the ground will come back ahead of the return from a further portion of the ground due to the finite speed of light and the slight difference between the two round trip paths. Thus, the energy returned from an illuminated area on the ground has a relatively wide pulse width as compared to the original outgoing pulse.

On the other hand, when the same pulse illuminates a target optic, it generates a return that retains the original pulse width, and it does not experience temporal stretching. Photons coming from the target optical system are not spread out because they all travel the same path length. They therefore all arrive back at the sensor at one time, e.g., within the pulse width of the laser.

It will also be appreciated that it is precisely this temporal difference between the returns that permits discrimination between targets and clutter. Since the returns from the ground are spread out, the photons do not arrive back at the search sensor in sufficient quantity at any given time to exceed the threshold to which the detector array is set. On the other hand, the target returns arrive all at once within a single frame time. This large number of photons impinging on the array will be sufficient to cause the array output to exceed the threshold, thus indicating the presence of the target.

In short, by using a direct-reading, thresholded focal plane array for the detector in an active search system, and by setting the threshold at a level that ignores temporally spread clutter, one can detect an event, meaning the detection of a target, by declaring an event when the threshold has been exceeded. Moreover, the detection of a target employing any kind of optical system may be reliably obtained with dramatically fewer sweeps of the search system.

Alternatively, while it might be assumed that one could simply use brute force and increase the laser power to such an extent that one could determine non-specular returns from targets versus clutter, such laser powers and weights are impractical for aircraft applications.

Typically, lasers employed in such target-seeking acquisition modes have outputs on the order of watts. With the subject direct-reading thresholded detector array, one can trade off the number of sweeps with the laser power such that, for instance, with four or five sweeps one could reduce the laser power by half and still obtain the same probability of intercept or detection of a target's optic.

In summary, it has been found that target optics produce non-specular augmented optical returns when interrogated by a laser pulse. This non-specular returned radiation is detected by an active laser search system employing a direct-reading, thresholded focal plane detector to be able to detect non-cooperating targets having optics that employ a focal plane. This is accomplished by setting the threshold for the detector array to discriminate against the smeared-out returns from ground clutter, while at the same time responding only to the relatively short non-specular returns from the target's optical system. The pulses returned from target optics have a pulse width commensurate with the pulse width of the transmitted pulse. The subject system thus discriminates against ground clutter while at the same time reducing the number of sweeps to guarantee detection of a target within the search area swept by the interrogating laser.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
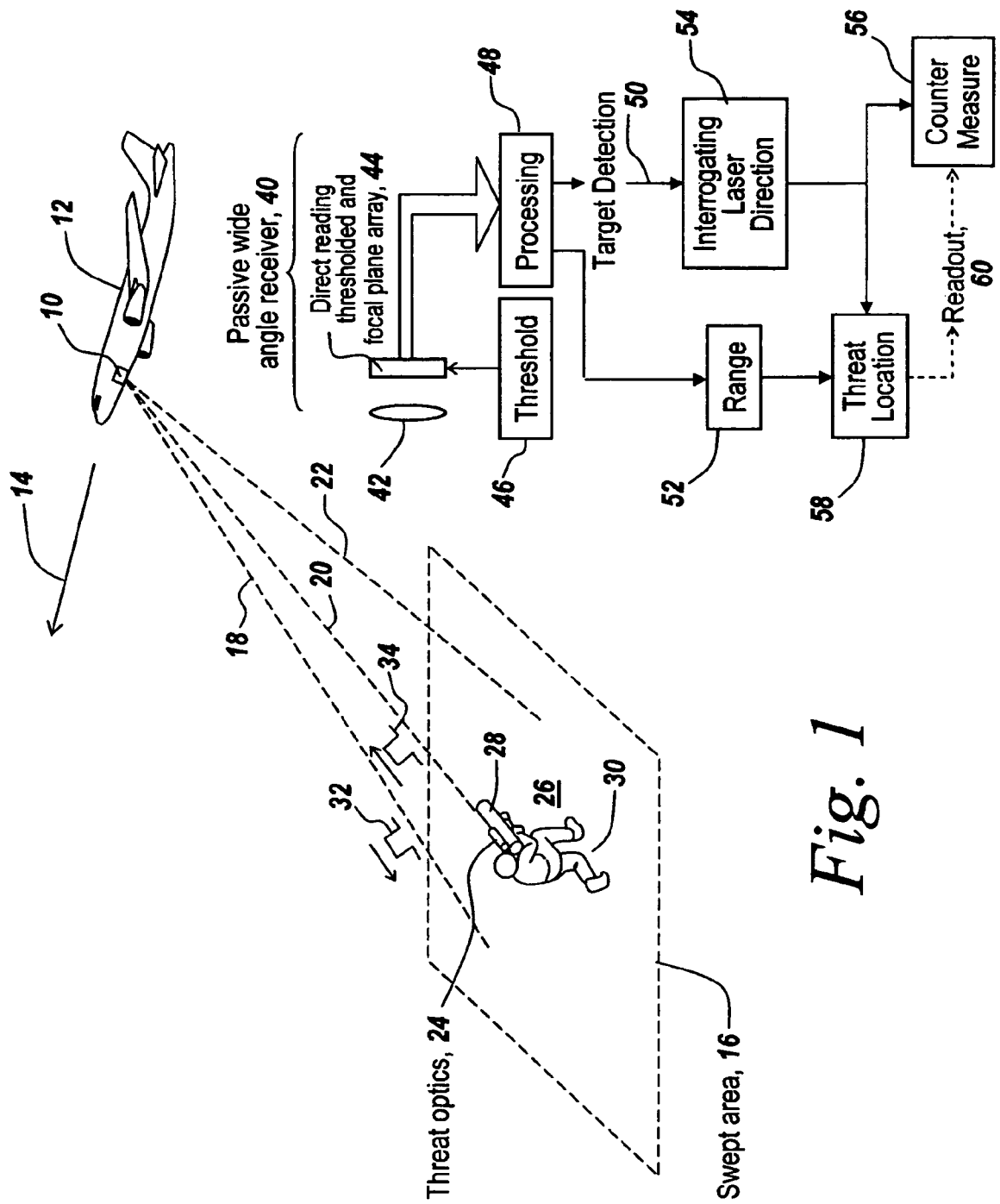
FIG. 1 is a diagrammatic illustration of an active, search system in which laser pulses from an overflying aircraft are swept across an area to detect threats, showing the use of a direct-reading threshold focal plane array to detect non-specular responses from threat optics.

Referring now to FIG. 1, an aircraft 12 flying in the direction indicated by arrow 14 and possessing an active search system 10 is shown. In this active system narrow laser pulses are projected in a scanned pattern along the directions 18, 20 and 22 over an area 16 to be searched. Here the narrow laser pulses that illuminate area 16 are denoted by reference character 32. It is the purpose of these scanned laser pulses to sweep area 16 in a reasonable time so that one can detect the presence of the optics 24 that accompany a threat ordnance 28 located at 26.

The threat is considered to have threat optics if, for instance, a lens is involved and there is something behind the lens at its focal plane. This could be, night vision goggles worn by an individual 30, or it could be any kind of telescopic sight used for aiming and or firing ordnance 28 at aircraft 12.

It is the purpose of system 10 to project a narrow pulse 32 towards area 16 and to detect return pulses 34 that are reflected by the optics 24 of a threat so that its presence and location can be ascertained. Note that it is important to be able to sweep a given area 16 as quickly as possibly and to determine in a small number of scans of the area whether or not a threat exists. This is particularly true if aircraft 12 is traveling at a high rate of speed and therefore encountering new search areas very rapidly.

In order to detect returns, a passive receiver 40 is located on aircraft 12 and includes, inter alia, a lens 42 behind which is a direct-reading thresholded focal plane array 44. This sensor typically has a wide-angle field of view or moves to follow the search beam through its scan pattern. The detection threshold for this array is set by a module 46, and its output is coupled to a processor 48. This output continuing on line 50 indicates a detection event whenever the radiation from the swept area 16 exceeds a predetermined threshold.

This indication of an event carries information that precipitates a response by aircraft 12. Specifically, the delay between the outgoing pulse and the arrival of the return is processed at 52 to calculate range to target, while the pixel address is translated at unit 54 to provide a two dimensional bearing or line of sight. This geolocation capability, along with information gained from further interrogation of the optics, is used to formulate a response 56 in the form of a countermeasure. If aircraft 12 is using a jammer that can be aimed along the path determined by unit 54, then countermeasure radiation from unit 56 can be directed along the path determined by unit 54 to the threat. More generally, any response on the spectrum between indifference and counterattack can be formulated and executed.

Figure 2:
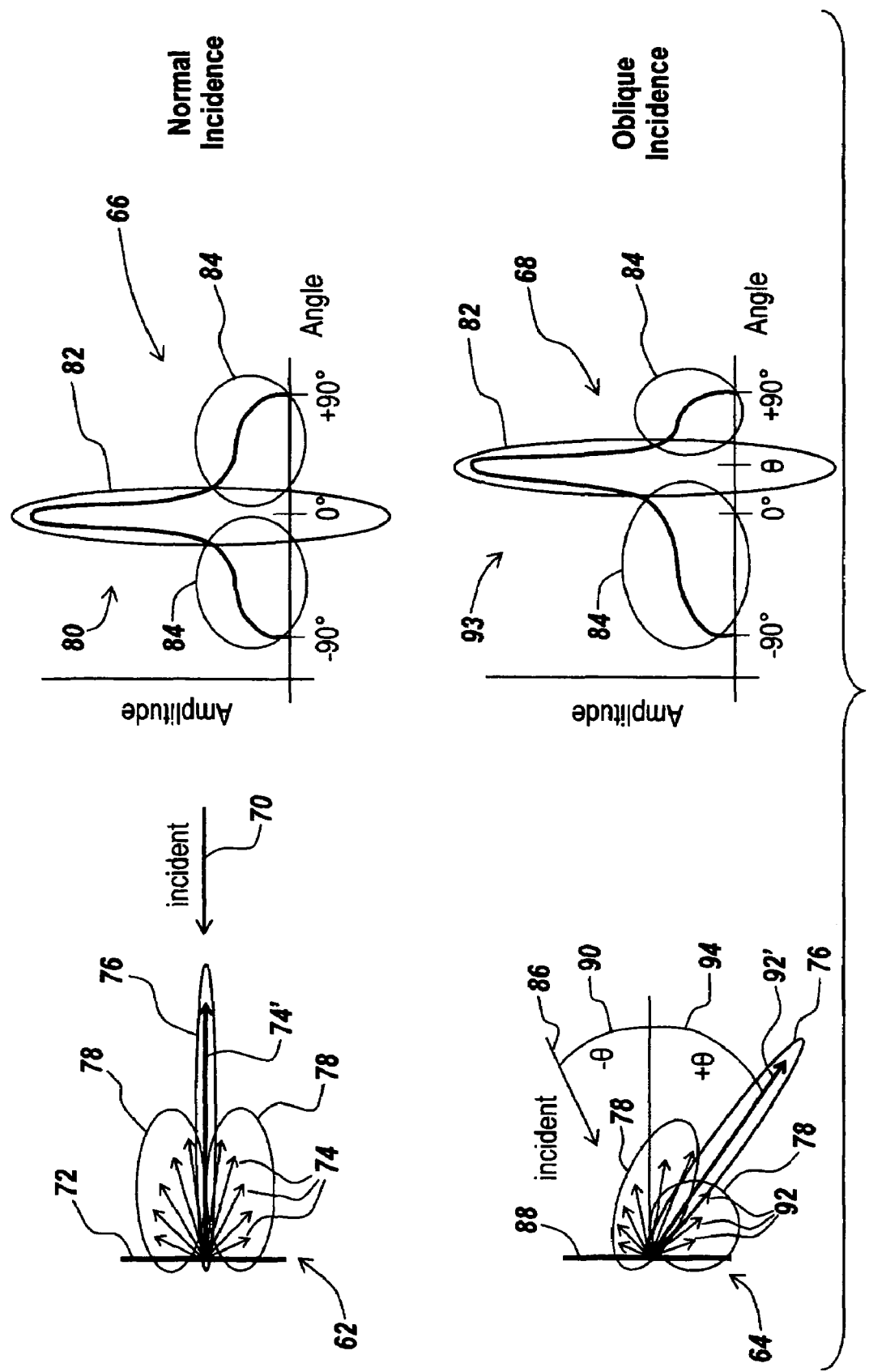
FIG. 2 is a diagrammatic illustration of specular and non-specular reflections from a surface at normal and non-normal incidence.

Referring now to FIG. 2, a number of different reflection geometries or configurations are illustrated. More precisely, the reflection off of normal or perpendicular surfaces is compared to oblique reflections. These two geometries are depicted respectively at 62 and 64, while the corresponding plots 66 and 68 on the right convey the amplitude of the return as a function of angle.

When photons 70 are incident upon a perpendicular surface 72, the reflected energy is back scattered in all directions as illustrated by the arrows 74. Arrow 74' is much longer than the rest in an attempt to capture the notion that this specular reflection 76 is much larger than all of the other non-specular or off-axis components 78.

Graph 80 of reflection amplitude as a function of angle reinforces this notion from a different perspective. The main specular peak 82 is much taller than the surrounding non-specular wings 84. In reality this difference can be even more pronounced, by orders of magnitude, but is illustrated on this scale for the sake of clarity.

In the oblique case, photons 86 strike the surface 88 from a different angle 90. Again there is reflection into all angles 92, the specular component 92' of which is the largest. In this case, however, the specular direction is offset by an angle 94 equal but opposite to the input angle 92'. Correspondingly, the reflection amplitude graph 93 is altered to reflect this behavior.

Figure 3:
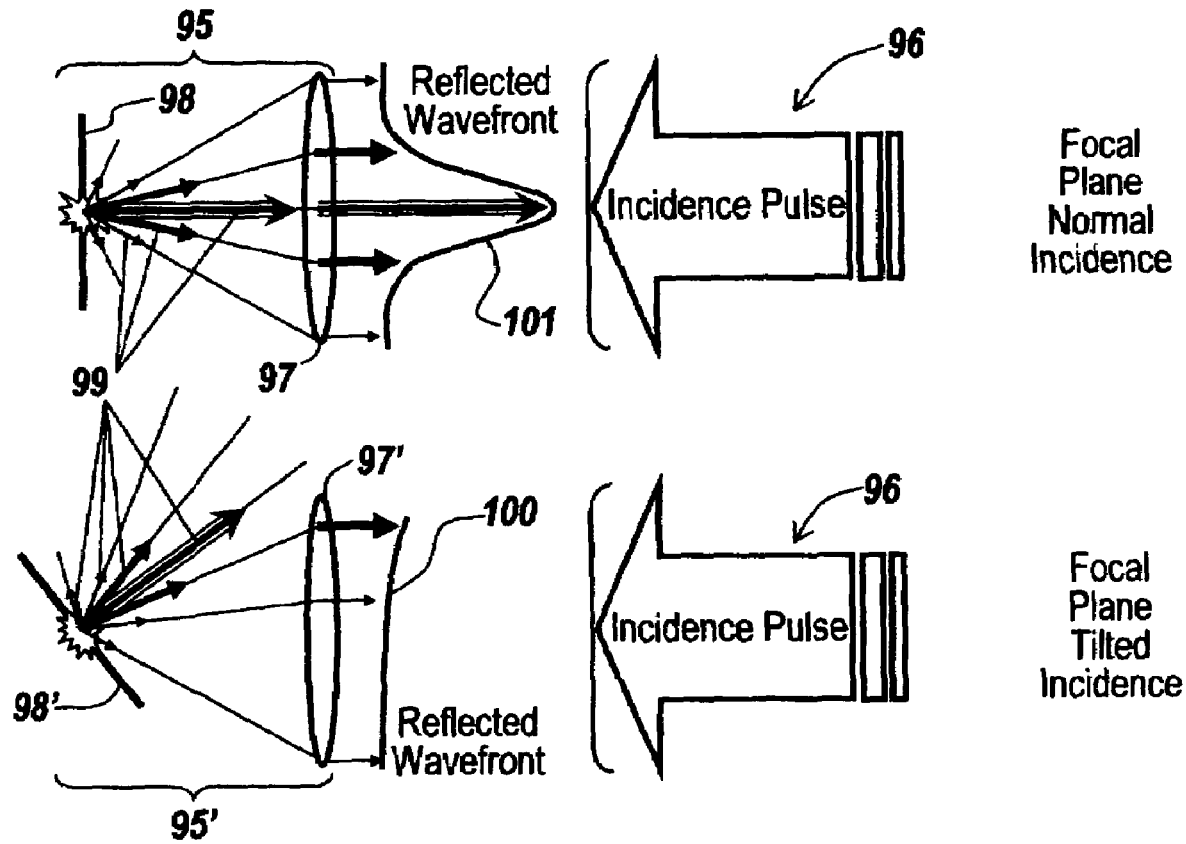
FIG. 3 is a diagrammatic illustration depicting three effects of tilting the detector at the focal plane of an optic, namely the optical augmentation of non-specular scatter, the suppression of the primary specular return, and the diminished amplitude of the return pulse.

Referring to FIG. 3, one can see these geometries applied to optical systems 95 and 95' being illuminated by search laser pulses 96. These pulses are focused by optics, depicted here as single lenses 97 and 97', onto their respective focal planes 98 and 98'. At this point, light is reflected back as described in FIG. 2, with the size and length of each arrow 99 conveying the strength of the return in that particular direction. In both cases, all of the reflected energy that finds its way back to lens 97 or 97' will be collimated into a beam, and sent back to the search system. This collimation happens regardless of whether a specific ray is specular or not because they all originate at the strike point of the focal plane 98 and 98'. By virtue of what a lens is and does, all rays 99 originating at the focal point emerge from the lens parallel to each other.

The difference rests in the fact that the oblique system produces wavefronts 100 that are much smaller than their normal counterparts 101. The normal or specular case acts in accordance with the Wild et al. patent mentioned above, whereas the smaller, oblique returns are those that have been found to be detectable. If a system looking for the specular returns described by Wild et. al., encounters the off-axis wavefronts 100, it could likely miss the detection due to lack of signal, owing to the fact that the strongest part of return 99 do not make it back out of lens 95'.

Figure 4:
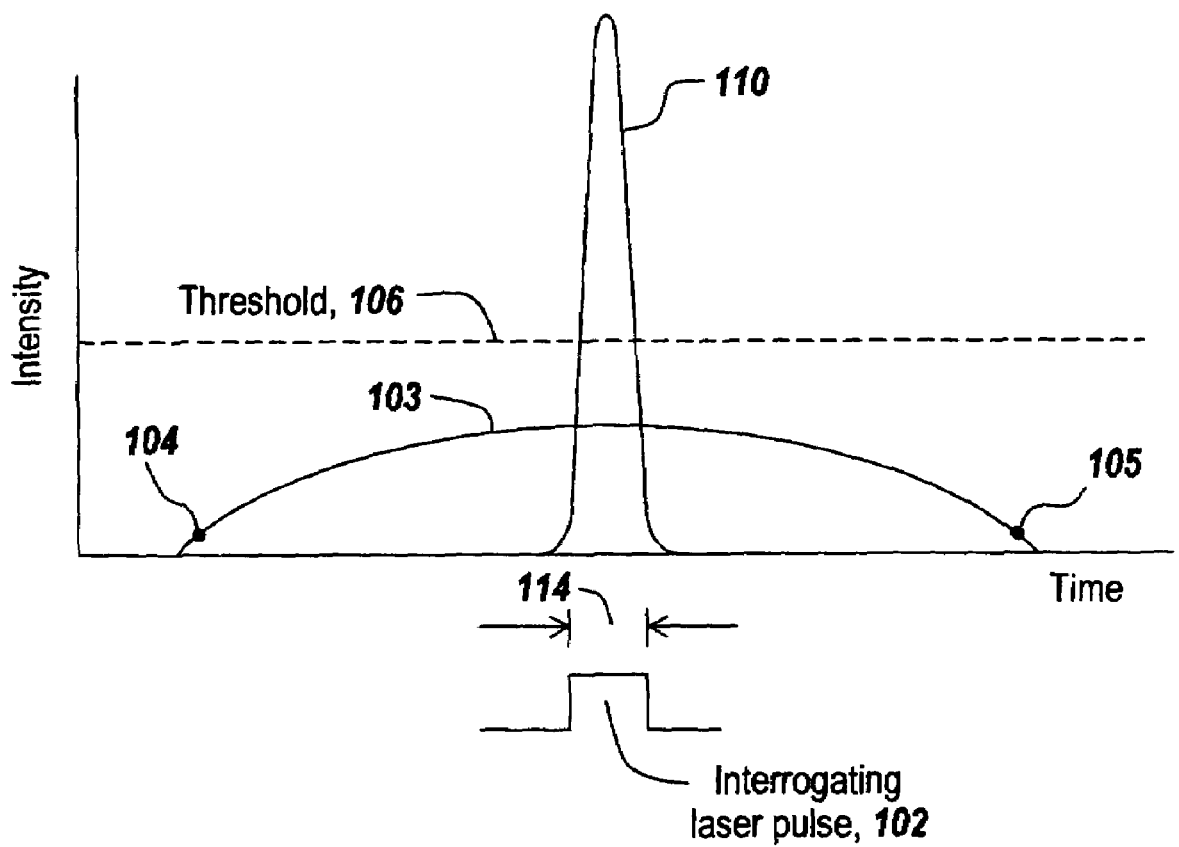
FIG. 4 is a graph showing the difference in intensity of returns reaching the search receiver from ground clutter that are stretched out over time, versus the non-specular returns from the focal plane of threat optics, illustrating that the ground clutter can be eliminated by thresholding.

Referring now to FIG. 4, an intensity-versus-time graph of return amplitudes reveals how reflections from search laser pulses 102 can be differentiated based on their temporal characteristics. Photons coming back from ground clutter as illustrated at curve 103 define a rather smeared-out envelope. Returns from the nearest portion of the search area, for instance at point 104, arrive at one period of time, whereas returns from the furthest point on the illuminated search area footprint arrive later as illustrated at 105. In between there is a continuum of ground clutter returns whose amplitudes, as can be seen from curve 103, are below a detection threshold 106 that is set sufficiently high.

This is stark contrast to the response 110 from target optics in which all of the photons arrive at the same time and hence there is no spreading. Every photon in this return travels the same distance, and therefore the return 110 is no broader than the width 114 of the original search pulse 102.

Figure 5:
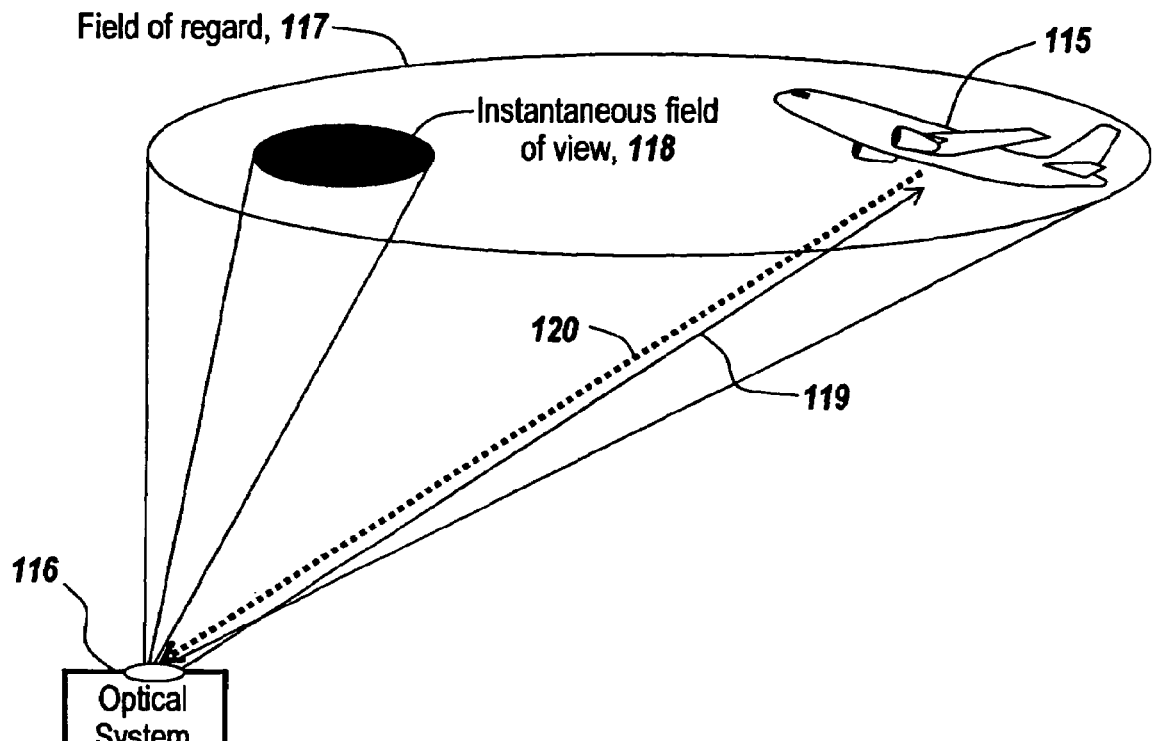
FIG. 5 is a diagrammatic illustration of the detection by an aircraft of off-axis returns from scanning threat optics when the aircraft lies outside the instantaneous field of view (IFoV), but remains within the larger optical field of regard (FoR)

The practical benefit of this can be illustrated in conjunction with FIG. 5. Here an aircraft 115 is flying over threat optics 116 of a scanning optical system whose field of regard is bounded by the large cone 117. At the instant depicted, aircraft 115 is within the field of regard depicted by cone 117, but not within the instantaneous field of view 118 of the optics that are presently looking elsewhere. The search system on the aircraft 115 illuminates threat optics 116 along path 120 and receives a return 119 that is several orders of magnitude down from its peak value because the instantaneous field of view is not pointed back at the aircraft.

If the search system were designed to only be capable of seeing peak specular returns, it would have to wait until the were within the instantaneous field of view in order to get an appreciable return. The subject system, however, by virtue of its clutter discrimination technique, can be made sensitive enough to operate in the low amplitude, non-specular regime depicted in FIG. 5. Such enhanced sensitivity means the subject system will find targets more quickly and require less power to do so. This is a critical advantage for fast moving aircraft facing the daunting scheduling task of detecting threats as rapidly as they penetrate new airspace.

Figure 6:
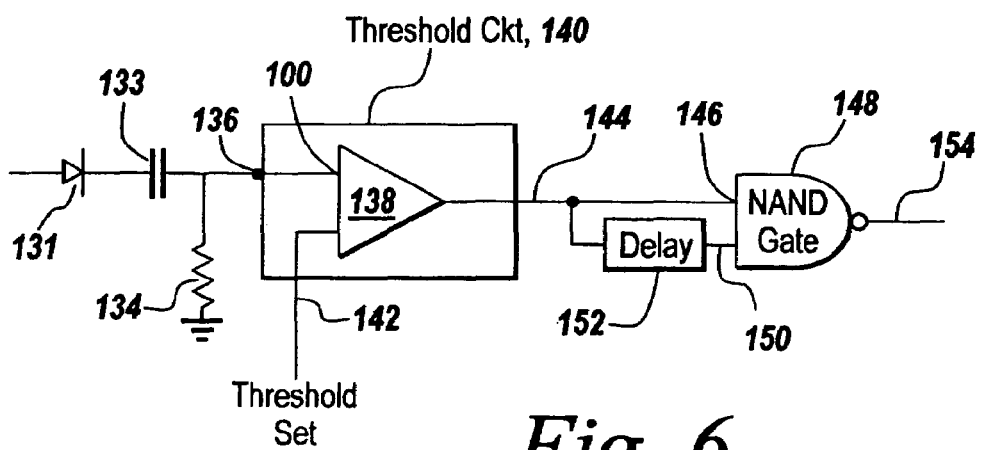
FIG. 6 is a schematic diagrammatic of one pixel of a direct reading focal plane array, showing the manner in which the threshold is set, followed by the use of a delay and a NAND gate for the robust reporting of an event.

Referring to FIG. 6, what is shown is one type of thresholding circuit that can be employed in a direct-reading focal plane array for the purposes of detecting extremely short pulses. As can be seen, a photo diode 131 that forms a pixel on the aforementioned direct-reading focal plane array is coupled through an RC circuit composed of capacitor 133 and resistor 134 to an input 136 of a differential amplifier 138 that forms a threshold circuit 140. The threshold for this circuit is set by signal on line 142 and provides output at 144.

Output in the form of a pulse or latch at 144 indicates that a detection event has occurred on the pixel. In this case a sufficient number of photons have reached the photo detector in a sufficiently short amount of time such that its output exceeds the threshold and reliably reports an event. With this threshold set relatively high, ground returns do not exceed the threshold and are therefore ignored or rejected.

Moreover, while an RC circuit might be used at the output of threshold circuit 140 in order to filter out long-lasting returns from a stretched-out pulse due to ground clutter, in one embodiment the output of threshold circuit 140 is coupled to one input 146 of a NAND gate 148 having as its other input a delayed signal 150 provided by a delay circuit 152. This delays output signal 144 from threshold circuit 140 by, for instance, one nanosecond.

The result is that the particular pixel element in the array will only output a signal 144 when there is radiation on detector 131 that exists for no more than one nanosecond or whatever the interrogating pulse length is. If it does, then there will be a signal applied to input 150 of NAND gate 148 that will prevent the generation of a pulse 154.

Figure 7:
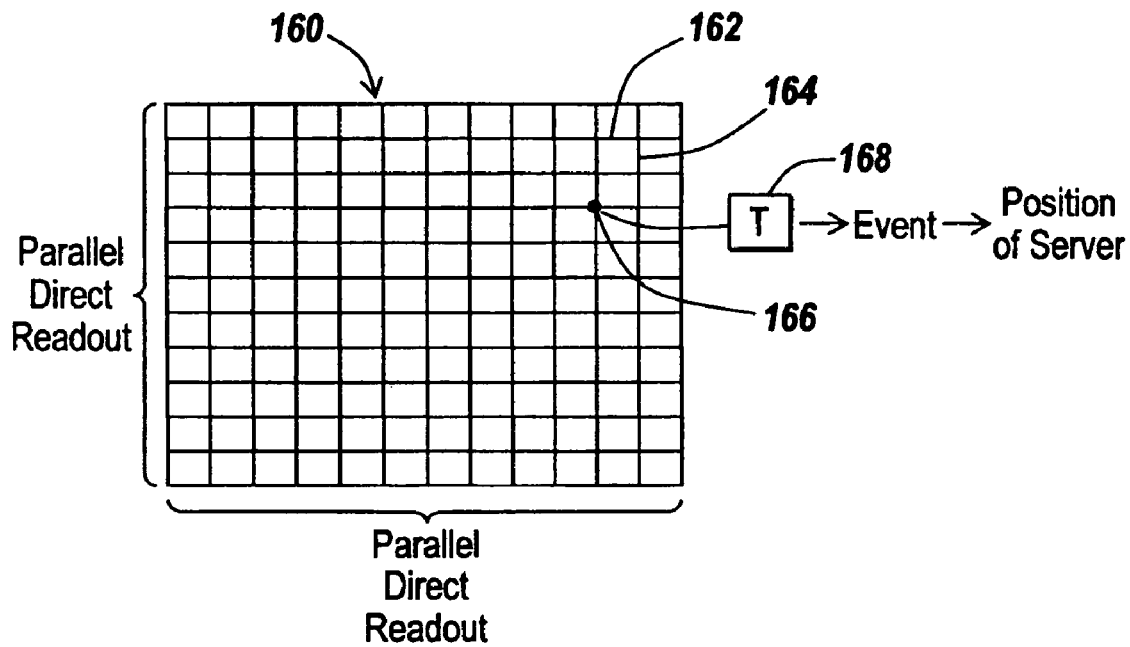
FIG. 7 is a diagrammatic illustration of the parallel direct readout of a focal plane array in which the array is provided with direct reading circuitry and thresholding.

Referring now to FIG. 7, an array 160 of such detectors is addressed by rows 162 and columns 164, with crosspoints of the array being read out in parallel by a direct readout system. Here, an event 166 is indicated at a particular point on the array when the associated threshold 168 has been exceeded.

As can be seen, an event occurs at array 160 when the predetermined threshold has been exceeded. In one scenario, it was found that during any one frame in which all of the 500-by-500 detectors in the array were read out, only one element was indicated as having had an event. Thus, while the array may be read out virtually simultaneously for all pixels, at any given time there will be only one event indicated. This means that one can use a direct readout of all elements of the array to detect even a low cross-section target such as that presented by non-specular returns.

Put another way, rather than periodically sampling and storing all of the pixels on the array, the array can be read out directly, with all the pixels of the array being read out in parallel. Instead of looking at each pixel and assessing whether or not there has been a detection, as is done with typical focal plane sensors, one can simply query the row and column registers that directly indicate which pixel has lit up. The likelihood that more than one crossover point of the array will indicate a detected target can be made exceedingly low. Thus, the probability that an indication from a particular threshold circuit is valid is close to 99%.

Figure 8:
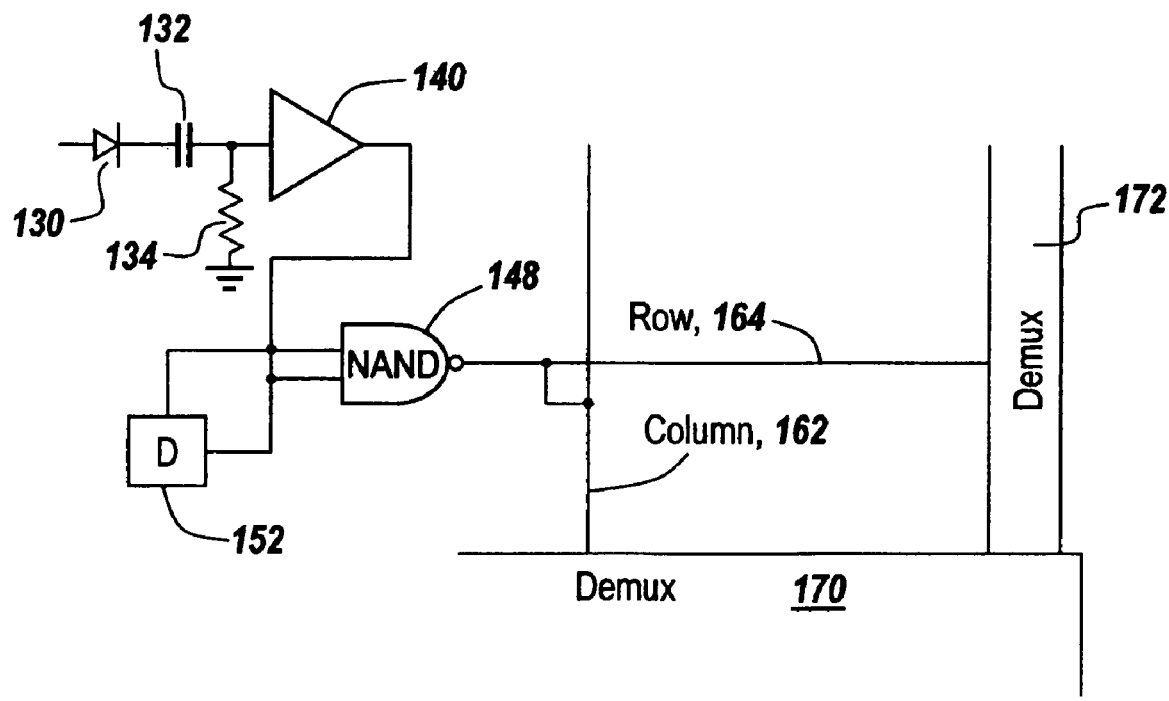
FIG. 8 is a diagrammatic illustration of the read-out of a pixel of the display of FIG. 7, illustrating the demultiplexing of rows and columns of the array of FIG. 7.

Referring now to FIG. 8, since the output of a particular NAND gate is addressable by a particular row and column, demultiplexing units 170 and 172 are used either asynchronously or synchronously to read out all of the pixels of the array grid. This can be done virtually simultaneously with standard demultiplexers operating in the one- to two-GHz range. What this means is that all of the pixels of an array can be directly read out by conventional demultiplexers in a time period less than the one-nanosecond pulse spacing.

It will be appreciated that, for a 500-by-500 array grid, if the focusing on the focal plane array is not sharp enough, a return may actually be focused on two or three adjacent pixels. It is a relatively simple matter to provide a NAND gate structure in the demultiplexer such that, if there are occurrences at adjacent detectors, they will be interpreted as being a single event.

While the direct reading focal plane array was originally designed for use against shoulder-fired missiles, it has now been found that it may be reliably used in a wide-angle receiver for detecting any type of threat optics when sweeping an area. Since it has been found that by irradiating a threat optic, one does generate non-specular returns and that the returns come out at wide angles, one can increase the probability that one can detect a threat optic if there is one in the search field.

Figure 9:
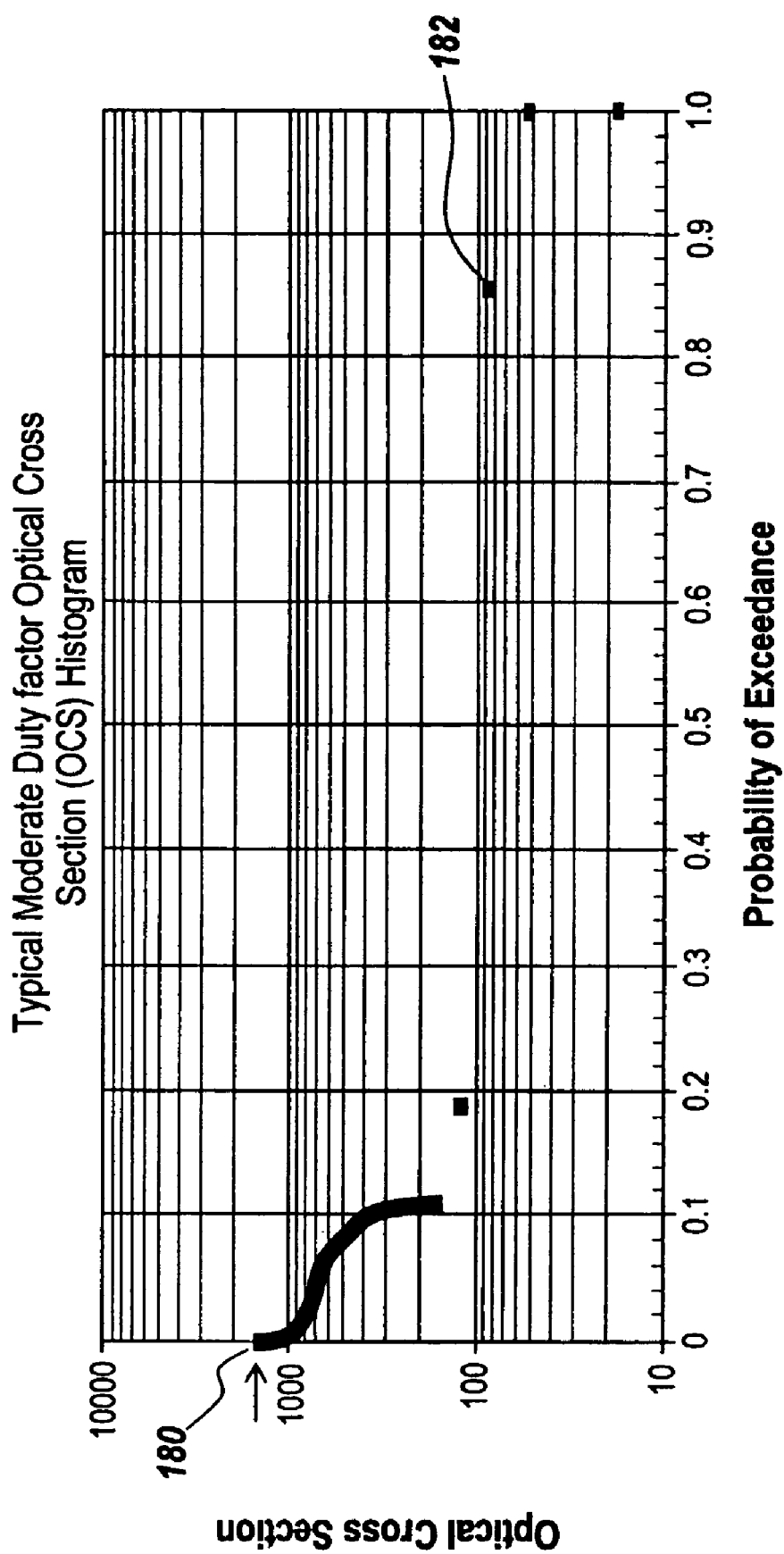
FIG. 9 is a graph of optical cross-section of a scanner system with moderate duty cycle versus the probability of exceedance (PoE) of a threshold, illustrating that for retro-reflected or specular reflections for which the optical cross-section is maximum, over 1,000, the probability of exceedance of the threshold is close to zero, whereas for non-specular returns where the optical cross-section falls to one-tenth of that, the probability of threshold exceedance is greater than 80%.

Referring now to FIG. 9, what is shown is a typical moderate duty cycle optical histogram in which optical cross-section is graphed against the probability of exceedance for a threshold. Note that the optical cross-section is a measure of the return in units of square meters per steradian ($m^2/sr$). Also note that the return from a threat optic is directly proportional to its optical cross-section. In other words, FIG. 9 indicates the probability that a single instantaneous measurement will exceed some amplitude. Here the optical cross-section for a specularly reflected return 180 has a near-zero probability of exceedance because it so rare. As the optical cross-section decreases, then probability of exceedance increases, ultimately to 100%. For non-specular returns such as illustrated at 182, when the optical cross-section drops below approximately one-tenth of its on-axis specular value, then the probability of exceedance increases dramatically to over 80%.

The implication here is that if one can intelligently trade the optical cross-section design point of a system in order to increase the likelihood of a return. Therein lies the promise of the subject invention. If one has a sensor that can detect a non-specular response two orders of magnitude below the peak value, one can dramatically increase the probability of exceedance for a single event to over 80%. As will be seen hereinafter, by doing so, one would decrease the number of laser scans or sweeps required to cover a given area.

Figure 10:
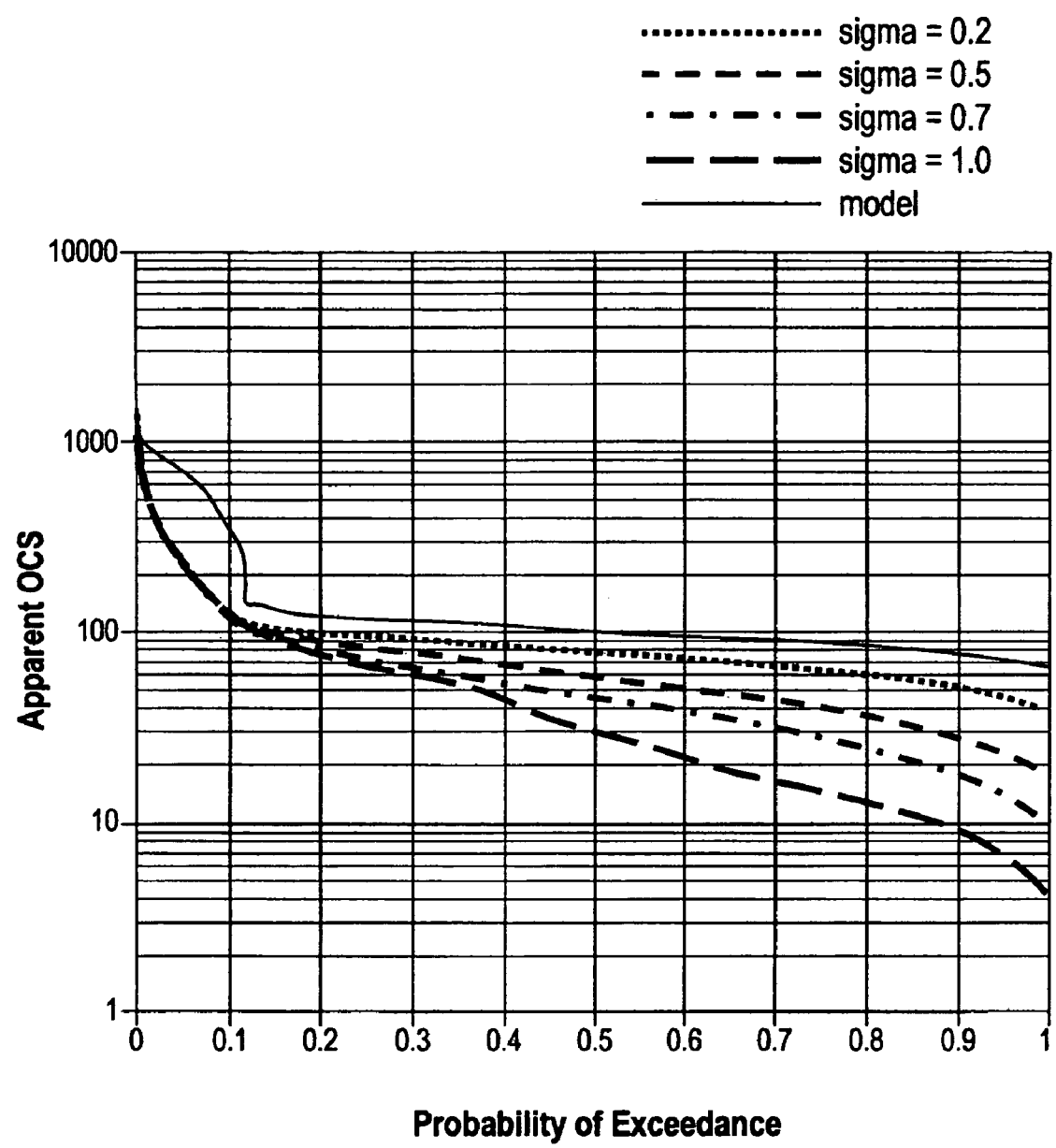
FIG. 10 is a histogram depicting the degraded effects of atmospheric turbulence upon return amplitudes, graphing apparent optical cross-section against probability of exceedance for a threshold, and illustrating that under the most turbulent air conditions there is substantial attenuation, with the degradation being more severe for specular than non-specular returns; and, FIG. 11 is a graph showing the number of looks required or the number of sweeps over a given area of ground to make sure that there are no hostile threats, with the graph indicating that if one looks for smaller amplitude returns that occur more often, one can greatly reduce the number of looks necessary to assure that there is no threat within a given search area.

FIG. 10 expands upon FIG. 9 by incorporating atmospheric effects like turbulence and scintillation as predicted by well-validated atmospheric models. It begins to address the fact that, for instance, over kilometers, the apparent strength of the return is modulated by scintillation in the atmosphere. The value of sigma in the legend is the measure of the power log normal distributed return amplitude variation due to turbulence along the two-way line of sight. Its effect is to reduce the already-low probability of exceedance of high optical cross-section values. Turbulence tends to saturate, so the Sigma of 1 is about as strong as this effect can become.

Under such turbulence, the apparent optical cross-section is reduced, and so to is the corresponding probability of exceedance. The critical observation, however, is that this penalty is much harsher for specular returns than it is over the non-specular portion of the histogram. In other words, by looking for lower returns that are available more of the time, the disadvantageous atmospheric effects can effectively be mitigated.

What can be seen from FIG. 10 is that the probability of seeing a specular return having an optical cross-section of 10,000 $m^2/sr$ is about 0.4%. As will be seen in FIG. 11, one would need approximately 400 trials to have an 80% chance of obtaining such a return. One would also require about 1,000 trials to have a 95% probability of such a return.

On the other hand, using the off-axis non-specular returns of 40 $m^2/sr$, one would require about eight trials to achieve a 95% probability of a return. All other factors being equal, this return amplitude is 25 times lower than that associated with specular returns. However, one needs about 125 times fewer pulses to achieve the 95% probability of detection. This leads to reductions in required laser power of 125/40 or about 3:1.

Since one is searching without prior knowledge of the sensor location, all factors are not equal. Suppose one needs to search a 5 km-by-5 km area. If one is to do this once per second with a perfect scanner, looking for the 1000 $m^2/sr$ signal requires that each pulse cover enough area to complete the search on time. If one has 1000 pulses per second, each pulse has to cover the entire 25 $km^2$. To look for the 40 $m^2/sr$ signal, one needs to put 8 pulses per area, allowing the coverage to be reduced to 25 $km^2$ /125. Thus the non-specular return technique produces a search energy reduction of 3*125 or about 375:1.

Even at this reduced power, the search area to be illuminated would be 200,000 $m^2$ (447 by 447 meters). With an aerial search, the footprint of the search illuminator spot projected on the ground is typically oblique with an aspect ratio of roughly 3:1. Thus the spot would be roughly 150 wide by 1350 meters long. Since the sensor optical cross-section is 40 $m^2/sr$, one is looking for 40 $m^2/sr$ out of 20 km. This ratio, with units of inverse steradians ($sr^{-1}$) corresponds to the bi-directional reflectance distribution function (BRDF), a formal system of describing non-specular scatter. One would receive equal returns from the sensor and the ground if the effective ground BRDF were larger than 40/200,000 or about $2\times10^{-4}$. This is a value frequently encountered.

If, however, one uses a short laser pulse and discriminates to accept only returns shorter than, say, 10 nanoseconds each element of the search area is now reduced to 1.5 meters in length by 150 meters across. The effective search area is now 225 meters and the BRDF to achieve an equal return is now 50/225 $sr^{-1}$ or about 0.222. The BRDF of gold plated sandpaper, a standard, is about 0.3. Thus the likelihood of encountering 222 m² of such a surface is very small. The short pulse capability is thus a key enabler of active search even with the use of non-specular returns.

This short pulse technique exploits the character of focused sensors that all paths through the optic have the same optical path length. Thus the return would be very nearly the same temporal width as the incident pulse. This constant travel time to achieve perfect focus is Fermat's Principle. For off-axis returns due to possible defocus it is not perfectly obeyed but the departures are in fractions of a light millimeter, typically measured in femtoseconds to a few picoseconds ($10^{-15}$ to $10^{-12}$ seconds).

It will be appreciated that looking for the specular pulse also requires fast pulse discrimination. Its BRDF allowance would be $1000/2.5 \times 10^{-7}$ or $4 \times 10^{-5}$. To obtain a reasonable signal to clutter ratio, the pulse length would have to be roughly 125 times shorter than for the non-specular case.

The BRDF view is also applicable to the threat sensor return. BRDF is a formal, efficient method of acquiring and characterizing off-axis scatter. This occurs regardless of how it is measured. The BRDF of focal planes can be used to predict non-specular but focused returns toward the interrogating laser. The non-specular return can come from various surface treatments of the sensor focal plane, many of which can enhance such scatter.

The companion to BRDF is BTDF (bi-directional transmission distribution function). It is a measure, also in $sr^{-1}$, of the radiation, in this case off the refractive path. This causes a spread in the spatial image of the transmitter beam formed at the threat focal plane.

Such scatter results in a lower on-axis return in significant part because it is more widely dispersed than purely geometric and diffraction models alone predict. This enables the transmitter and receiver to be more widely separated than they could be for a specular return search. This separation reduces the potential for cross talk between the transmitter and receiver due to scatter from optics or nearby environmental scatterers such as dust.

It will be appreciated that in real applications atmosphere turbulence causes beam spread and further reduces the chance for seeing the peak optical cross-section. It will further be appreciated that what the graph of FIG. 9 is saying is that if one has a very high return when the target optic or the threat optic is looking directly at the interrogating laser, the probability of getting that return or its exceeding a threshold is very low. Most of the time, the threat optic is looking somewhere else. Thus, if one causes a laser pulse to impinge upon the threat optic, the returns detectable are an order or two of magnitude down from the specular response.

Figure 11:
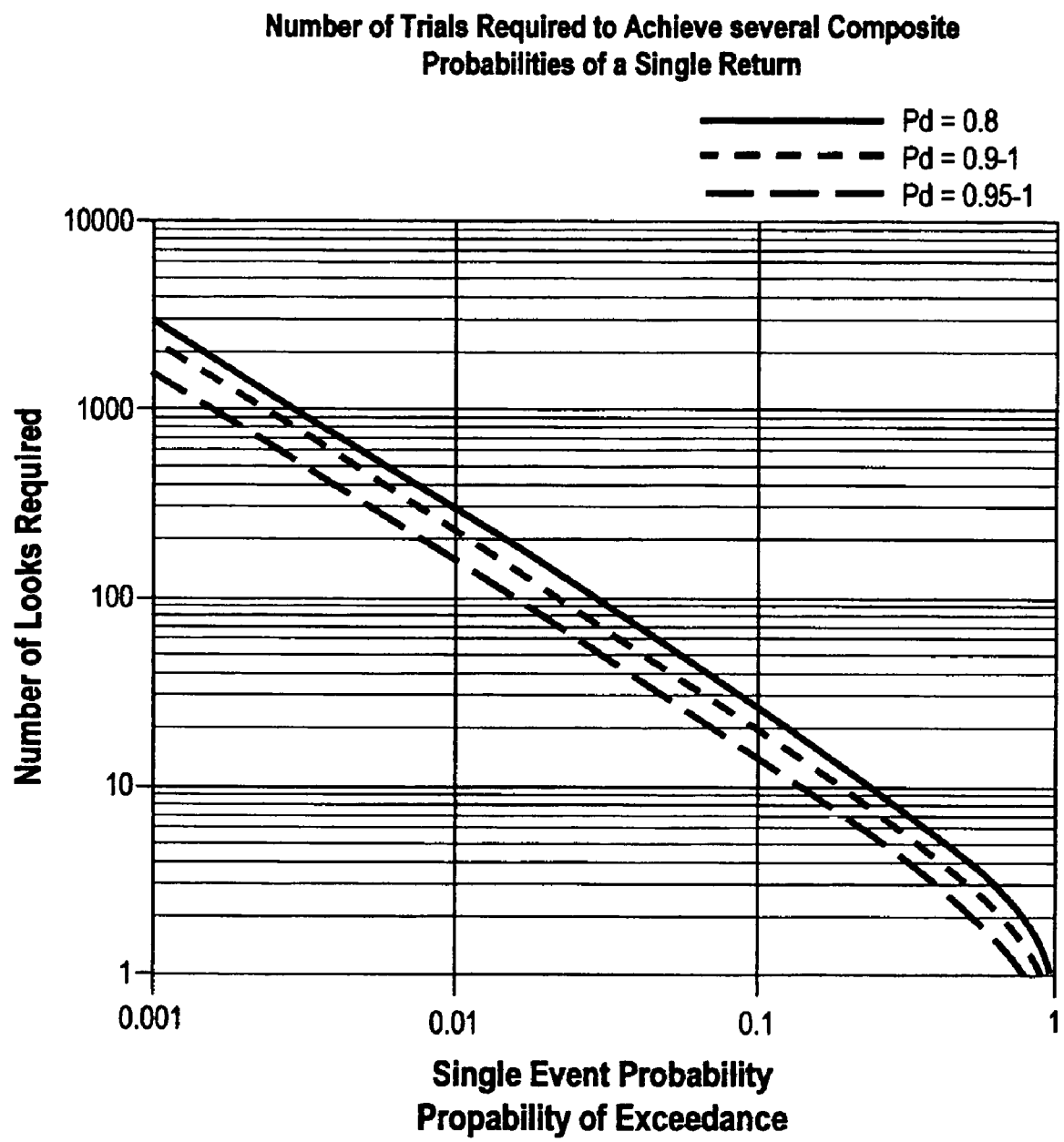

Referring to FIG. 11, what is graphed is the number of looks required to achieve a certain overall detection probability, given a single look probability of exceedance or single event probability (SEP). This formulation will be recognized simply as the binomial or compound probability equation. What this graph shows is that, if one has a sweep that scans the ground at a certain rate, there is a particular probability associated with any single look of getting a return. One then has to know how many looks are needed or how many sweeps one has to do in order to make sure, say with 90% certainty, that there are no threats in a given area.

In other words, one needs to be concerned with how many times or how much attention must be paid to each patch of ground to make sure that nothing is there. When operating in the Wild et al. regime for detecting high optical cross-section targets, one would need to take a couple of thousand looks to be certain. That is to say, if the target is rarely seen or rarely looking exactly at the interrogating laser when it is illuminated, one must spend an inordinate amount of time, perhaps thousands of scans, making sure nothing is there.

By contrast, when operating in the 50% single event probability regime, one would expect to get a return approximately half of the time. Since the system is looking for and capable of detecting the smaller off-axis returns, these are encountered much more frequently. Depending on the strength of atmospherics, roughly a dozen looks would be required to be reasonable sure the area was empty.

What the graph of FIG. 11 also shows is that, although the SEP decreases with laser power, one can adjust for this by marginally increasing the number of sweeps.

In summary, the advantages of the subject system are, first, that one needs a lower number of scans in order to search a given area for potential threats. Second, one can use lower power lasers to produce the same result. Third, because of the lower power requirements, one can fit the active search system on a tactical jet. The subject invention lowers requirements for power consumption, cooling, physical size and weight within the envelope of a tactical jet aircraft.

Most importantly from a performance standpoint, it takes only a couple of looks at every given ground footprint in order to achieve adequate search results. This is critical for the timely detection and response to emerging threats. Its success can be measured relative to the couple of seconds between the emergence of a threat and its use. For example, the time it takes to remove a lens cap, aim, and fire in on the order of a few seconds. Note that when one is traveling in an aircraft at 650 knots, it is exposing itself to additional square kilometers at that same rate. Every millisecond saved in scanning or dwell time provides faster responses and hence more security.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for identifying a target employing optics, comprising the steps of:
   illuminating a target having optics with an optical axis with a pulsed laser beam; and,
   detecting off-axis non-specular reflected returns from the optics of said target having pulse widths matching that of the pulse width of the pulses in the laser beam.

2. The method of claim 1, wherein said target illuminating step includes sweeping the beam from said laser over a predetermined area on the ground.

3. The method of claim 2, wherein the number of sweeps necessary to identify the presence of a target in the predetermined area with a predetermined reliability is minimized due to the detection of non-specular reflected returns from the target.

4. The method of claim 1, wherein the detecting step includes detecting the non-specularly reflected returns utilizing a focal plane array.

5. The method of claim 4, wherein the focal plane array includes a thresholded focal plane array.

6. The method of claim 5, wherein the thresholded focal plane array is a direct reading focal plane array.

7. The method of claim 5, wherein the threshold for the thresholded focal plane array is set such that the focal plane array is unresponsive to non-specular reflections from the ground.

8. The method of claim 7, wherein the threshold is set such that the focal plane array is unresponsive to non-specular reflections from objects which do not employ optics.

9. The method of claim 1, wherein the laser is a pulsed laser emitting pulses with a predetermined pulse width and wherein the detection step includes detecting only reflected pulses having pulse widths approximating the pulse width associated with the pulses from the laser.

10. The method of claim 9, wherein the pulse widths from the laser are in the nanosecond range.

11. The method of claim 1, wherein the detectable non-specularly reflected returns are at least an order of magnitude down from the specularly reflected returns.

12. The method of claim 11, wherein at least some of the non-specular returns are directed back towards the laser.

13. In an active search laser system in which laser pulses are swept over a swept area, a method for minimizing the number of sweeps necessary to accurately ascertain the presence of optics within the swept area in which the optics have an optical axis, comprising the step of:
   detecting off-axis non-specularly reflected returns from any optics in the swept area by detecting only reflected return pulses having pulse widths approximating the pulse widths of the laser pulses, whereby the detection of non-specularly reflected returns permits reducing the number of sweeps necessary over the detection of specularly reflected returns.

14. The method of claim 13, wherein the detecting step includes using a thresholded focal plane array.

15. The method of claim 14, wherein the threshold for the array is set high enough to eliminate ground clutter.

16. The method of claim 15, wherein the thresholded focal plane array is a direct reading array.

17. The method of claim 13, wherein the pulse widths are in the nanosecond range, whereby the nanosecond pulses are detectable due to the use of the direct reading array.

18. An active search method for establishing the existence of an optical threat target in an area surveyed by a swept laser beam, comprising the steps of:
   projecting narrow pulse width laser pulses towards the surveyed area in a swept fashion so as to cover the area in a predetermined number of sweeps designed to obtain with a predetermined confidence level whether or not a threat optic is present within the swept area;
   detecting non-specular returns from a threat optic within the swept area using a direct reading thresholded focal plane array;
   setting the threshold for the direct reading thresholded focal plane array to a threshold below which ground clutter is rejected; and,
   detecting only returned pulses having a pulse width equal to the pulse width of the transmitted laser pulse, whereby the number of predetermined sweeps in the swept area to achieve a predetermined certainty of detection is minimized.

19. The method of claim 18, and further including the step of directing countermeasure radiation along the direction from which the detected non-specular return comes.

* * * * *

UNITED STATES PATENT AND TRADEMARK OFFICE
CERTIFICATE OF CORRECTION

PATENT NO. : 7,282,695 B2 Page 1 of 1
APPLICATION NO. : 11/064589
DATED : October 16, 2007
INVENTOR(S) : Jonathan L. Weber et al.

It is certified that error appears in the above-identified patent and that said Letters Patent is hereby corrected as shown below:

On the title page, item (73), delete "BAE Systems Information and Electric Systems Integration Inc." and insert therefor --BAE Systems Information and Electronic Systems Integration Inc.--

Signed and Sealed this

Thirty-first Day of August, 2010

David J. Kappos
*Director of the United States Patent and Trademark Office*